UNITED STATES PATENT OFFICE.

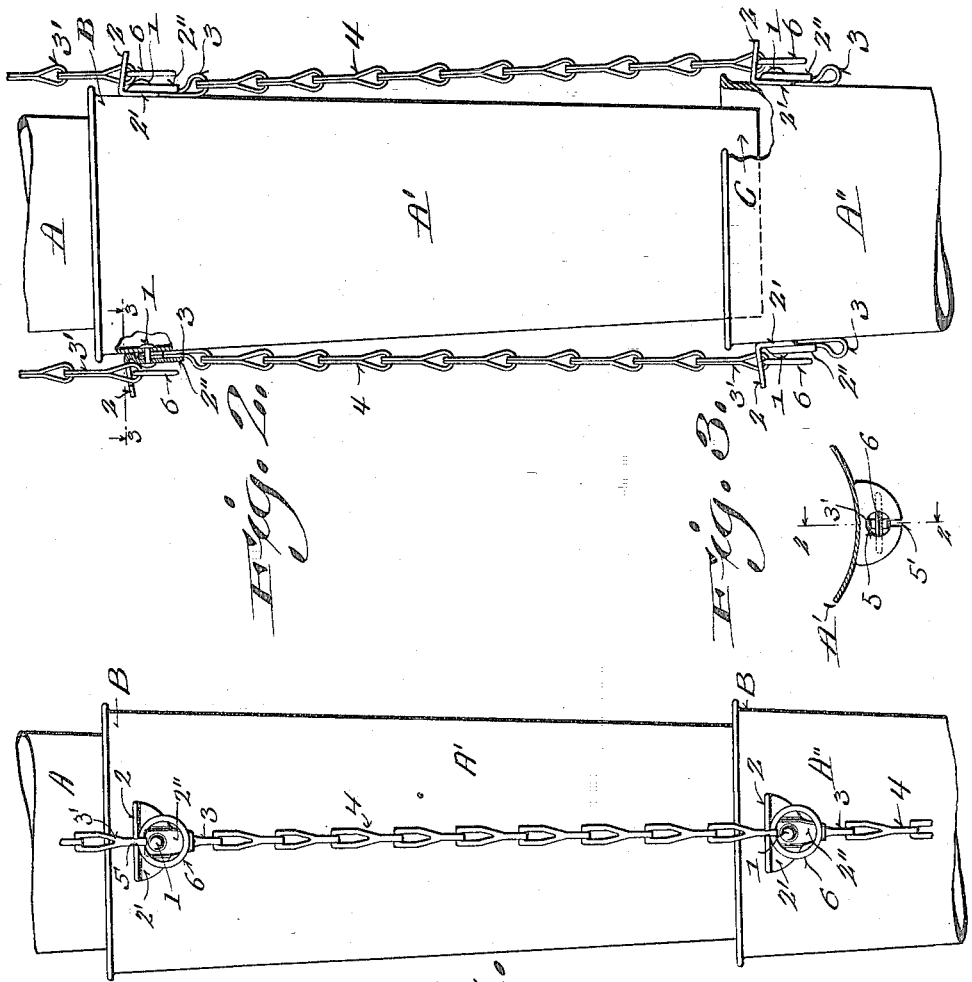

HENRY M. GEHL, OF WEST BEND, WISCONSIN.

FLEXIBLE DISTRIBUTER-PIPE.

1,220,740.

Specification of Letters Patent.   Patented Mar. 27, 1917.

Application filed October 2, 1914.   Serial No. 864,633.

*To all whom it may concern:*

Be it known that I, HENRY M. GEHL, a citizen of the United States, and resident of West Bend, in the county of Washington and State of Wisconsin, have invented certain new and useful Improvements in Flexible Distributer-Pipes; and I do hereby declare that the following is a full, clear, and exact description thereof.

My invention has for its object to provide a simple, economical and effective means for coupling the sections of a distributer pipe, whereby all load strain is eliminated from the pipe sections.

Specific objects of my invention are to provide a flexible runner preferably in the form of a chain or cable which is secured to each pipe section having a male coupling member at one end and a female coupling member at the opposite end for connection to like runners of other pipe sections, whereby said pipe sections can be readily connected or disconnected to the runners thus coupled together that sustain the entire load of the series of sections;

To provide a female coupling element in the form of an ear having a keyhole slot, which ear is secured to the pipe section adjacent to its upper end and is also secured to the upper end of the chain section, the opposite free end of said section being provided with a male coupling member, and To provide a runner or chain having its upper end secured to the coupling ear, the said chain section being of a length approximately equaling the length of pipe section to which it is attached.

My invention is particularly designed to be utilized in connection with distributer pipes for silo filling apparatus. Under ordinary conditions, the pipe sections of such distributers are connected by coupling members which are secured respectively to the upper or female end of one pipe section for engagement with the companion members secured to the lower or male ends of the other pipe section, under which conditions all of the load strain is sustained by the series of pipe sections so coupled. This coupling arrangement also precludes a wide scope of flexure in the pipe and, owing to the short stretches of the coupling mechanism, it has been found in practice to be exceedingly difficult and unwieldy in effecting a coupling or uncoupling movement. These objectionable features mentioned are therefore eliminated in the construction of a distributer pipe embodying the features of my invention.

With the above and other minor objects in view the invention consists in certain peculiarities of construction and combination of parts as clearly set forth hereinafter with reference to the illustrations and subsequently claimed.

In the drawings

Figure 1 represents a side elevation of a series of flexibly connected pipe sections embodying the features of my invention;

Fig. 2, another side elevation of the same looking in the direction at a right angle to the first mentioned elevation, with parts broken away and in section to more clearly illustrate details of construction, the section being indicated by line 2—2 of Fig. 3, and Fig. 3, a detailed sectional plan view of coupling elements embodying one feature of my invention, the section being indicated by line 3—3 of Fig. 2.

Referring by characters to the drawings, A, A' and A'' indicate distributer pipe sections, the upper female ends B of which are adapted to receive the male ends C of the preceding section in the ordinary manner. The female ends of each section have secured thereto, by rivets 1, oppositely disposed companion female coupling members in the form of ears 2. The lobe 2' of each ear is apertured for the reception of the rivet 1 and is provided about the rivet with an offset portion 2'' which forms, in connection with a juxtaposed face of the distributer pipe, a cavity for a chain link 3, through which link the rivet 1 also passes, whereby the upper end of a runner or chain section 4 is secured to the upper or female end of the distributer pipe. It is understood that, while I have shown and described the runners as being in the form of chain sections 4, I may, without departing from the spirit of my invention, employ any type of flexible runners such, for instance, as a cable or like element. The ears 2, as shown, are offset from the distributer pipe wall and are provided with keyhole slots 5, the throats 5' of which are adapted to receive a male coupling member. The male coupling members are secured to the lower ends of each of the chain sections or runners and, in this exemplification of my invention, the said male coupling members comprise rings 6 which are fitted in the loops of the last chain link 3' of the series. Thus in effecting a coupling operation the chain links 3' are pushed through the throat 5' of the keyhole slot which constitutes the female coupling member and the ring 6, in passing under the ear, will engage its surface and draw upon the runners or chain stretches will be resisted by said ring. Attention is also called to the fact that the ears 2 are slightly inclined downwardly, whereby the tendency of the runners 4 is to draw inwardly under load to avoid inadvertent uncoupling of the runner coupling elements.

As shown, the companion runners are secured adjacent to the upper ends of the distributer pipe sections and are of a length approximately equal to the length of the same and, owing to the fact that they swing freely from the coupling ears, the maximum flexibility is obtained, whereby the connected pipe sections can be readily swung in any direction. It will be further observed that, when the series of pipe sections are coupled together, the chain stretches form continuous runners, whereby all of the load strain is relieved from the body of the pipe sections, it being understood that the uppermost section of the series is suspended from any suitable point of anchorage at or adjacent to the top of the silo, not shown, to which the distributer pipe is applied.

I claim:

In a distributer pipe section, means for connecting it with adjacent sections comprising angular brackets each having one arm provided with a groove on its inner face, a runner member having one end insertible in said groove, a bolt passed through said bracket arm and through the runner member and through the section, means carried by the other arm of the bracket for securing a runner end, and means at the end of the first named runner for co-acting with the securing means of the bracket of an adjacent section.

In testimony that I claim the foregoing I have hereunto set my hand at West Bend in the county of Washington and State of Wisconsin in the presence of two witnesses.

HENRY M. GEHL.

Witnesses:
 EDWARD J. GEHL,
 J. W. GEHL.

Copies of this patent may be obtained for five cents each, by addressing the "Commissioner of Patents, Washington, D. C."